(12) United States Patent
Crean

(10) Patent No.: US 6,565,144 B1
(45) Date of Patent: *May 20, 2003

(54) RECREATIONAL VEHICLES WITH WALK-IN CLOSET

(75) Inventor: Johnnie Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/945,332

(22) Filed: Aug. 31, 2001

Related U.S. Application Data

(63) Continuation-in-part of application No. 09/714,787, filed on Nov. 15, 2000, now abandoned, which is a continuation-in-part of application No. 09/283,708, filed on Apr. 1, 1999, now Pat. No. 6,170,903

(60) Provisional application No. 60/229,841, filed on Aug. 31, 2000.

(51) Int. Cl.[7] .................................................. B60P 3/335
(52) U.S. Cl. ..................................... 296/168; 296/26.13
(58) Field of Search .............................. 296/168, 26.13, 296/171, 170, 173, 172, 175, 176, 165, 181, 26.01; 52/67, 745.1

(56) References Cited

U.S. PATENT DOCUMENTS

| | | |
|---|---|---|
| 1,536,518 A | 5/1925 | Osborn |
| 2,150,615 A | 3/1939 | Sword |
| 2,177,394 A | 10/1939 | Pierce |
| 2,225,319 A | 12/1940 | Rollo |
| 2,606,057 A | 8/1952 | Johnson |
| 2,639,187 A | 5/1953 | Grumbache |
| 2,704,223 A | 3/1955 | Houdart |
| 2,788,791 A | 4/1957 | Pospisil et al. |
| 2,876,035 A | 3/1959 | Houdart |
| 3,106,750 A | 10/1963 | Jarman |
| 3,165,350 A | 1/1965 | Willson |
| 3,254,914 A | 6/1966 | Steck |
| 3,287,058 A | 11/1966 | Wells |
| 3,300,839 A | 1/1967 | Lichti |
| 3,341,986 A | 9/1967 | Brosig |
| 3,565,480 A | 2/1971 | McCollum et al. |
| 3,572,809 A | 3/1971 | Buland |
| 3,608,954 A | 9/1971 | Lynd |
| 3,719,386 A | 3/1973 | Puckett et al. |
| 3,735,998 A | 5/1973 | Green |
| 3,740,088 A | 6/1973 | Ratcliff |
| 3,801,138 A | 4/1974 | Quick |
| 3,825,281 A | 7/1974 | Howard |
| 3,850,470 A | 11/1974 | Trelle |

(List continued on next page.)

FOREIGN PATENT DOCUMENTS

| | | |
|---|---|---|
| CH | 353262 | 9/1957 |
| DE | 42 04 640 A | 8/1993 |
| GB | 616274 | 5/1949 |
| GB | 2088789 | 11/1980 |
| GB | 2 260 951 | 5/1993 |
| IT | 478931 | 5/1951 |

OTHER PUBLICATIONS

Carefre, the World's Greatest Selection of RV Awnings, Sidewinder II, vol. 8, Issue 1, p. 19, 1997.
Brochure: Ideal from Alfa, Nov. 1996.

*Primary Examiner*—Kiran Patel
(74) *Attorney, Agent, or Firm*—Knobbe, Martens, Olson & Bear, LLP

(57) ABSTRACT

A recreational vehicle having an expandable room wherein the room can be positioned in a retracted or deployed configuration. In the deployed configuration, the room expands inwardly into the main housing of the vehicle so as to enlarge the area of the room without displacing the fixtures and plumbing that are typically positioned adjacent an outer wall of the room. The room can be extended in conjunction with an exterior slide-out assembly wherein the deployed slide-out assembly creates a larger inner living space so as to accommodate the expanded room wherein the expanded room comprises a walk-in closet.

15 Claims, 11 Drawing Sheets

U.S. PATENT DOCUMENTS

| | | |
|---|---|---|
| 3,887,220 A | 6/1975 | Hall |
| 3,895,726 A | 7/1975 | Rassieur |
| 3,902,752 A | 9/1975 | Pelletier |
| 3,915,492 A | 10/1975 | Agnese |
| 3,918,510 A | 11/1975 | Hayward |
| 3,959,985 A | 6/1976 | Schulze, Sr. |
| 4,014,586 A | 3/1977 | Swofford |
| 4,106,732 A | 8/1978 | Whiting |
| 4,108,326 A | 8/1978 | Bertolini |
| 4,109,954 A | 8/1978 | Wall |
| 4,127,299 A * | 11/1978 | Blair ......................... 296/168 |
| 4,147,379 A | 4/1979 | Winslow |
| 4,175,576 A | 11/1979 | Iby |
| 4,322,108 A | 3/1982 | McPherson |
| 4,457,554 A | 7/1984 | Fuisz et al. |
| 4,468,823 A | 9/1984 | Tounjian |
| 4,480,866 A | 11/1984 | Komatsu |
| 4,500,132 A | 2/1985 | Yoder |
| 4,550,946 A | 11/1985 | Hanemaayer |
| 4,589,463 A | 5/1986 | Ryan |
| RE32,262 E | 10/1986 | Stewart |
| 4,652,041 A | 3/1987 | Barber et al. |
| 4,653,125 A | 3/1987 | Porter |
| 4,719,954 A | 1/1988 | Curtis et al. |
| 4,728,144 A | 3/1988 | Crean |
| 4,729,594 A | 3/1988 | Hoff |
| 4,746,164 A | 5/1988 | Crean |
| 4,772,063 A | 9/1988 | Amy |
| 4,776,631 A | 10/1988 | Sargent et al. |
| 4,841,897 A | 6/1989 | Claflin |
| 4,867,502 A | 9/1989 | Sylvester et al. |
| 4,955,661 A | 9/1990 | Mattice |
| 4,957,323 A | 9/1990 | Johnson |
| 4,960,299 A | 10/1990 | Steadman |
| 4,971,355 A | 11/1990 | Studdard |
| 4,974,899 A | 12/1990 | Sargent |
| 5,028,072 A | 7/1991 | Lindsay |
| 5,061,001 A | 10/1991 | Madden et al. |
| 5,090,749 A | 2/1992 | Lee |
| 5,100,196 A | 3/1992 | Dodgen |
| 5,100,716 A | 3/1992 | Juneau |
| 5,112,082 A | 5/1992 | Clelland |
| 5,143,418 A | 9/1992 | Fouquet |
| 5,171,056 A | 12/1992 | Faludy et al. |
| 5,199,120 A | 4/1993 | Holmes |
| 5,212,926 A * | 5/1993 | Beasley ..................... 52/745.1 |
| 5,237,782 A | 8/1993 | Cooper |
| 5,242,185 A | 9/1993 | Carr et al. |
| 5,248,005 A | 9/1993 | Mochizuki |
| 5,280,990 A | 1/1994 | Rinard |
| 5,291,701 A | 3/1994 | Delacollete et al. |
| 5,358,298 A | 10/1994 | Fate |
| 5,374,094 A | 12/1994 | Smith et al. |
| 5,401,050 A | 3/1995 | Baker |
| 5,403,063 A | 4/1995 | Sjostedt et al. |
| 5,419,607 A | 5/1995 | Oliveira |
| 5,516,182 A | 5/1996 | Aragon et al. |
| 5,529,825 A | 6/1996 | Sutherland |
| 5,560,444 A | 10/1996 | Tiedge |
| 5,566,918 A | 10/1996 | Becker |
| 5,567,003 A * | 10/1996 | Gill ........................... 296/173 |
| 5,620,224 A | 4/1997 | DiBiagio et al. |
| 5,634,683 A | 6/1997 | Young |
| 5,658,031 A | 8/1997 | DiBiagio et al. |
| 5,658,032 A | 8/1997 | Gardner |
| 5,673,962 A | 10/1997 | Maieli et al. |
| 5,706,616 A | 1/1998 | Fernandez |
| 5,718,253 A | 2/1998 | McNamee |
| 5,734,336 A | 3/1998 | Smithline |
| 5,746,473 A | 5/1998 | Crean |
| 5,785,373 A | 7/1998 | Futrell et al. |
| 5,788,306 A | 8/1998 | DiBiagio et al. |
| 5,791,715 A | 8/1998 | Nebel |
| 5,791,726 A | 8/1998 | Kaufman |
| 5,800,002 A | 9/1998 | Tiedge et al. |
| 5,816,639 A * | 10/1998 | DiBiagio et al. ......... 296/26.13 |
| 5,833,294 A | 11/1998 | Williams et al. |
| 5,860,686 A * | 1/1999 | Tiedge ................... 296/26.14 |
| 5,894,698 A | 4/1999 | Dewald, Jr. et al. |
| 5,902,001 A | 5/1999 | Schneider |
| 5,915,774 A | 6/1999 | Tiedge |
| 5,934,026 A | 8/1999 | Green |
| 5,940,012 A | 8/1999 | Studebaker |
| 5,951,082 A | 9/1999 | DiBiagio et al. |
| 5,983,576 A | 11/1999 | Hanser et al. |
| 6,007,142 A | 12/1999 | Gehman et al. |
| 6,098,346 A | 8/2000 | Miller et al. |
| 6,158,794 A | 12/2000 | Flanagan |
| 6,170,903 B1 | 1/2001 | Crean |
| 6,231,115 B1 | 5/2001 | Crean |
| 6,260,909 B1 | 7/2001 | Crean et al. |
| RE37,351 E | 9/2001 | Crean |
| 6,290,284 B1 * | 9/2001 | Crean ........................ 296/168 |
| 6,293,612 B1 * | 9/2001 | Crean ..................... 296/26.13 |
| 6,302,475 B1 * | 10/2001 | Anderson ................ 296/26.12 |
| 6,343,830 B1 * | 2/2002 | Ingram et al. .............. 296/168 |
| 6,439,648 B1 * | 8/2002 | Crean ........................ 296/182 |
| 6,447,048 B2 * | 9/2002 | Crean ........................ 296/168 |

* cited by examiner

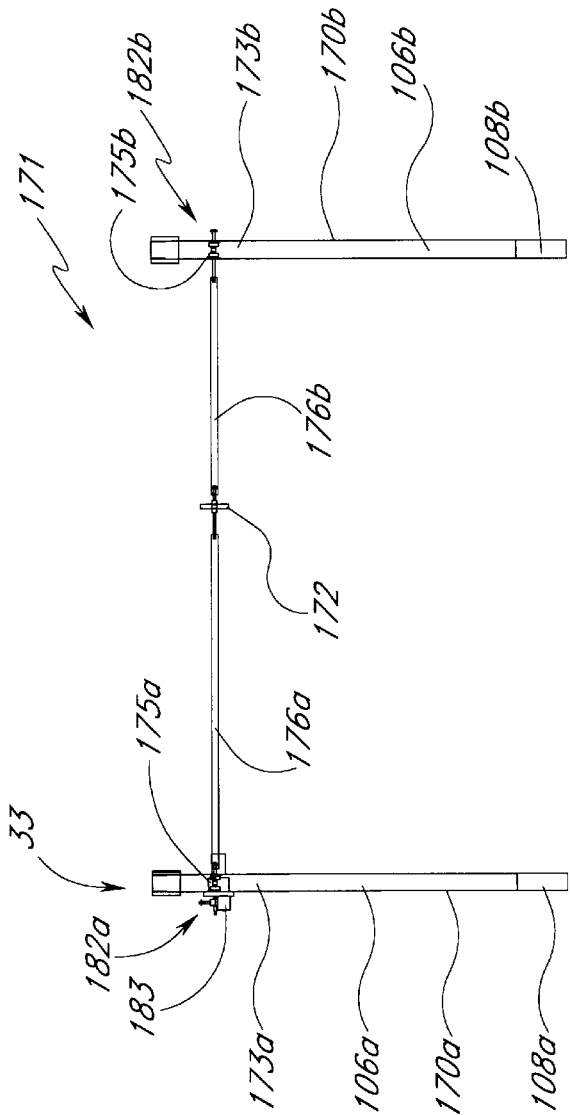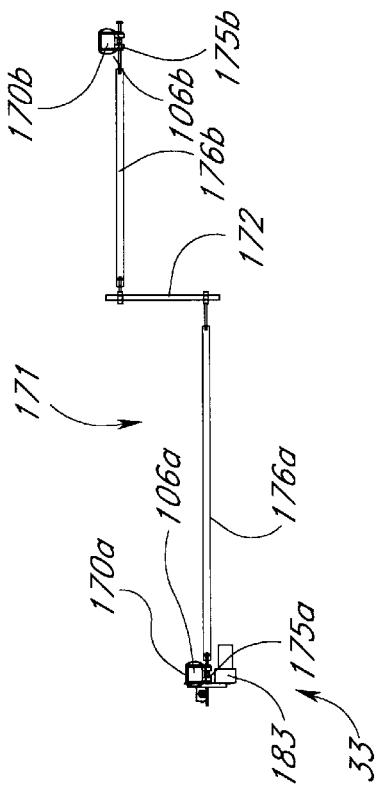
FIG. 3A
FIG. 3B

RECREATIONAL VEHICLES WITH WALK-IN CLOSET

RELATED APPLICATIONS

This application claims the benefit of U.S. Provisional Application No. 60/229,841, filed Aug. 31, 2000 and is also a Continuation-in-Part of Applicant's U.S. patent application Ser. No. 09/714,787, filed Nov. 15, 2000, now abandonded entitled "RECREATIONAL VEHICLES WITH WALK-IN CLOSET", which is a continuation in-part of Applicant's U.S. patent application Ser. No. 09/283,708 filed Apr. 1, 1999 now U.S. Pat. No. 6,170,903, entitled "TRAVEL TRAILER WITH EXTENDABLE TWO LEVEL BATHROOM AND BEDROOM", which is hereby incorporated by reference in its entirety.

BACKGROUND OF THE INVENTION

1. Field of the Invention

The present invention relates to travel trailers and in particular relates to travel trailers that are adapted to expand in size so as to increase the effective interior area of the travel trailer.

2. Description of the Related Art

Recreational vehicles (RV) are becoming increasingly popular with people who wish to retain the comforts and conveniences of home while spending extended periods of time away at remote locations. In response to consumer demand, manufacturers of travel trailers have developed increasingly larger travel trailers. However, state and federal laws limit the dimensions of travel trailers that can be transported on public roads, thereby limiting the living space within the travel trailer. In particular, current regulations specify a maximum length, otherwise known as the maximum allowed length, of highway bound travel trailers to be no greater than 40 feet. Furthermore, current regulations specify a maximum width, otherwise known as the maximum allowed width, of highway bound travel trailers to be no greater than 8.5 feet. Thus, the travel trailer industry has devoted considerable resources to develop improved travel trailers so as to increase the living space of the travel trailer in a manner that is consistent with the foregoing size restrictions.

As such, floor plans in most travel trailers are configured to maximize the use of available living space for essential living areas such as the bedroom, bathroom, and kitchen. Typically, other rooms that are common in houses are sacrificed such that the limited floor space within a trailer can be reserved for these essential living areas. However, since many people who buy large fifth wheel trailers are using these trailers as a more or less permanent residence, the loss of rooms, such as walk in closets and the like creates a less comfortable living arrangement.

This space constraint within the travel trailer makes it essentially impractical for manufacturers to install space consuming amenities such as walk-in closets that are usually occupied only on an occasional basis. Thus, walk-in closets are generally not included in the floor plans of conventional recreational vehicles known in the art. Consequently, people who are accustomed to spacious walk-in closets at home are deprived of the convenience of having access to similarly sized closets in the recreational vehicle.

In a typical fifth wheel trailer layout, the bedroom is located at the far forward end of the travel trailer. The main living section, which incorporates living areas, kitchens and the like are commonly located towards the rear of the travel trailer and the bathroom is typically located between the bedroom and living room. This results in the front of the trailer essentially functioning as a private bedroom suite. However, towards the front of the trailer, the interior height dimension is typically the smallest which results in an overall reduction in the total volume of the trailer in this private bedroom area.

As a consequence, storage space for clothing, which in houses is typically stored adjacent the bedroom and bathroom is quite limited. This results in the occupants of the trailer either limiting the amount of clothing they take in the trailer or storing some of their clothes in the larger main living section of the trailer. However, many people do not want to store their clothes in a more common area of the trailer which is not adjacent the bedroom or bathroom.

From the foregoing, it will be appreciated that there is an on-going need for an improved travel trailer with a layout that permits large walk in closets for the convenience of the occupants. To this end, there is a further need for a layout that will permit the existence of these walk-in closets in the front of a fifth wheel trailer adjacent a bedroom and bathroom.

From the foregoing, it will be appreciated that there is a need for an improved travel trailer having an interior area that includes a walk-in closet, To this end, it will be appreciated that there is also a need for a travel trailer with an extendable housing that encompasses a walk-in closet.

SUMMARY OF THE INVENTION

The aforementioned needs are satisfied by the travel trailer of the present invention comprising a frame, a set of wheels attached to the frame to permit rolling movement of the trailer over the ground, a multilevel floor attached to the frame, wherein the multilevel floor defines the inner living space of the trailer and wherein the multilevel floor includes a first level positioned at a first height above the plurality of wheels and a second level positioned at a second height above the plurality of wheels, and a main housing comprising of a plurality of walls mounted above the frame that enclose the inner living space of the trailer.

Furthermore, the travel trailer comprises an extendable housing assembly attached to a first wall of the plurality of walls of the trailer wherein the extendable housing assembly includes a multilevel floor having a first and a second level and a plurality of walls mounted at the outer edges of the floor. Preferably, the extendable housing assembly is movable between a retracted configuration and a deployed configuration. The extendable housing in one embodiment expands the livable floor space in the area adjacent the front of the trailer. As such, the livable floor space adjacent the bedroom and bathrooms is thus expanded thereby allowing a walk-in closet to be included in this area of the trailer without a decrease in size of the bathroom area or bedroom area.

In one embodiment, the first level comprises a walk-in closet wherein the walkin closet is positioned within the extendable housing assembly so that when the extendable housing is in a deployed configuration, a portion of the walk-in closet is positioned outside the first wall of the trailer. However, due to the increase in floor space resulting from the multi-level slide out, the walk-in closet can be positioned in the main portion of he housing without loss of floor space for the bedroom or bathroom and without departing from the spirit of the present invention.

In one embodiment, the walk-in closet comprises at least 21 square feet of space. In another embodiment, the area of the walk-in closet is preferably at least 4% of the inner living space of the travel trailer, more preferably at least 5%. Furthermore, the walk-in closet comprises a door covering an opening sufficiently large for an individual to enter. Inside the walk-in closet, there is an area for individuals to hang articles of clothing and store personal items.

Preferably, there are at least two parallel rods that extend across the ceiling of the closet and are adapted for hanging articles of clothing. Moreover, the walk-in closet also comprises an access space sufficiently large so that individuals can change clothes inside the closet and move freely inside the closet. In another embodiment, the second level of the extendable housing comprises a sleeping area having a queen size bed. Advantageously, the travel trailer of the preferred embodiment provides individuals the convenience of having a spacious walk-in closet where they can store their personal belongings and yet still be able to move freely inside. Furthermore, the travel trailer provides a spacious walk-in closet without sacrificing any living space that is typically available in most travel trailers.

These and other objects and advantages will be more apparent from the following description taken in conjunction with the accompanying drawings.

BRIEF DESCRIPTION OF THE DRAWINGS

FIG. 3A is an overhead plan view of a two level actuator assembly of the travel trailer of FIG. 1 that actuates the two level extendable member between the retracted configuration and the deployed configuration;

FIG. 3B is a side elevational view of the actuator assembly of FIG. 3A;

DETAILED DESCRIPTION OF THE PREFERRED EMBODIMENT

Figure 1:
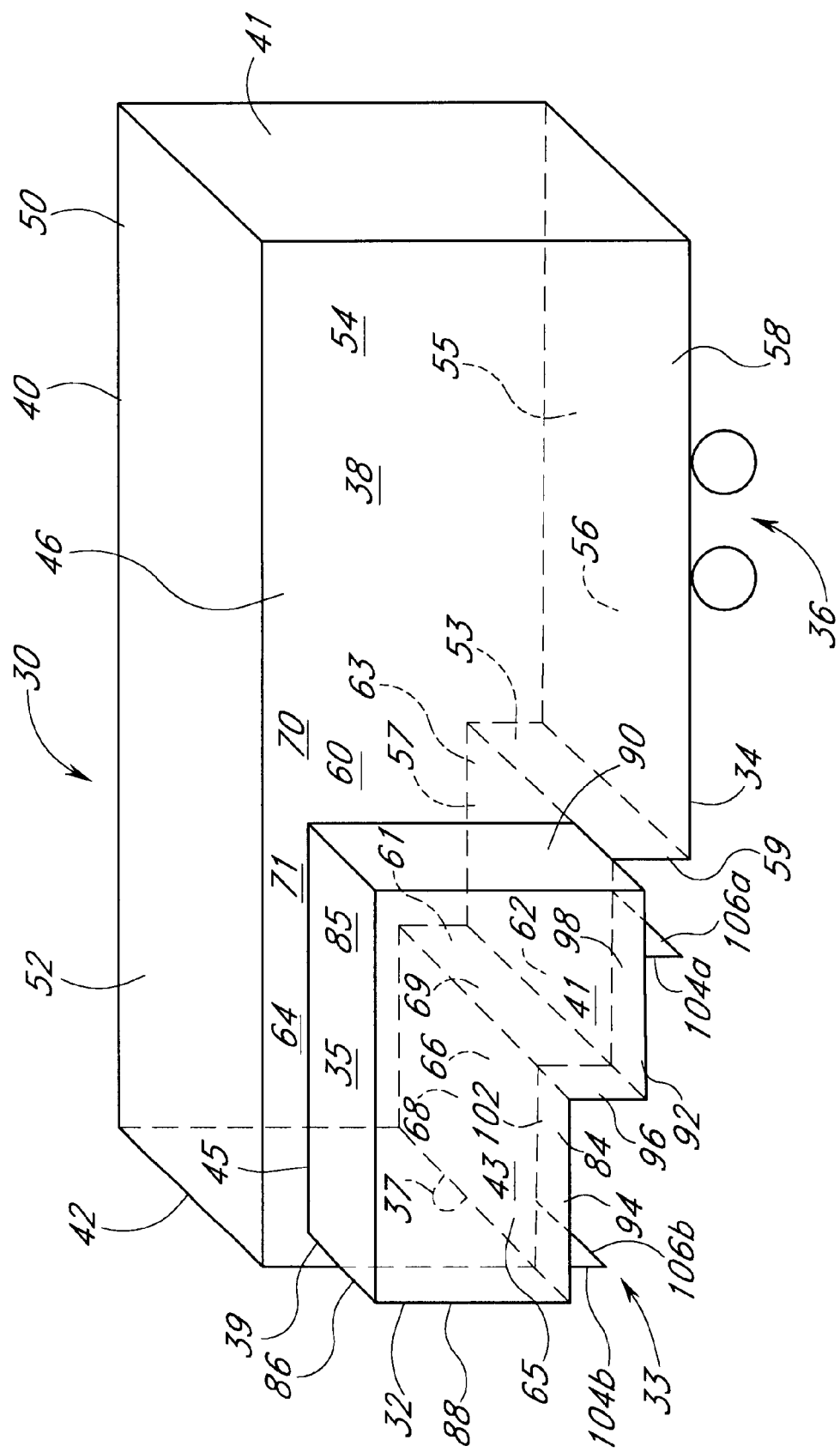
FIG. 1 is a perspective view of a recreational travel trailer of the present invention that comprises a two level extendable member.

Reference will now be made to the drawings wherein like numerals refer to like parts through out. In particular, FIG. 1 schematically illustrates a recreational fifth wheel travel trailer 30 comprised of a main housing 40 and a two level extendable housing 32, wherein the extendable housing 32 is shown extending from an opening 39 of the main housing 40 in a deployed configuration. As will be described in greater detail below, the two level extendable housing 32 can either be placed in the deployed configuration so as to effectively increase a living space 38 of the trailer 30 or be placed in a retracted configuration so as to provide that trailer 30 with a more suitable size and shape for being towed on a public road. Furthermore, although the preferred embodiment of FIG. 1 includes the extendable housing 32 that extends from the left side of the trailer 30, it will be appreciated that the extendable housing 32 could be adapted to extend from the right side of the trailer 30 in another embodiment.

In this application, the adjectives "front", "rear", "left", "right", "inboard", "outboard", "longitudinal", and "lateral" will be frequently used to indicate the spatial relationship between many of the elements of the trailer 30. In particular, the adjective front is used to indicate that the corresponding element is positioned proximal to a front end of the trailer 30 and the adjective rear is used to indicate that the corresponding element is positioned proximal to a rear end of the trailer 30, wherein the trailer 30 preferably travels on a road with the front end leading and the rear end lagging. Furthermore, the adjectives left and right are defined with respect to an observer who is looking at the trailer 30 along a direction that extends from the rear end of the trailer 30 to the front end of the trailer and are used to indicate that the corresponding element is either positioned adjacent to the left side of the trailer 30 or adjacent to the ride side of the trailer 30. Moreover, the adjective inboard refers to an element being positioned proximal to a medial line that extends from the rear end of the trailer 30 to the front end of the trailer 30 and the adjective outboard refers to an element being positioned distally from the medial line. Additionally, the adjectives longitudinal and lateral are used to indicate direction, wherein longitudinal refers to a horizontal direction that extends between the rear and front ends of the trailer 30, and wherein lateral refers to a horizontal direction that extends between the left and right sides of the trailer 30.

As generally shown in FIG. 1, the trailer 30 further comprises a frame 34 that structurally supports the trailer 30. Essentially, the frame 34 forms a multilevel structure and is constructed from conventional structural members in a manner known in the art so that the frame 34 structurally supports the main housing 40 of the trailer 30. In the preferred embodiment, the frame 34 is comprised of a rear horizontal platform 58, a front horizontal platform 65, and a middle horizontal platform 63 interposed therebetween. However, it will be appreciated that, in other embodiments, the frame 34 could be comprised of a different number of platforms. Furthermore, the frame 34 comprises a rear vertical riser 59 that joins the rear horizontal platform 58 with the middle horizontal platform 63 so that the platform 63 is elevated above the platform 58. Moreover, the frame 34 comprises a front vertical riser 61 that joins the middle horizontal platform 63 with the front horizontal platform 65 so that the platform 65 is elevated above the platform 63.

In the preferred embodiment, the platforms 58, 63, and 65 of the frame 34 are formed from steel structural members. However, it will be appreciated that frame 34 could be constructed in alternative manner in other embodiments of the invention. For example, the rear platform, in an alternative embodiment, could be formed of steel members and extended in length so as to join with a single steel riser that joins with the front platform formed of steel. Furthermore, the middle platform, in this alternative embodiment, could comprise a wooden structure that mounts at the front of the rear platform.

As generally shown in FIG. 1, the main housing 40 is mounted above the frame 34 and is essentially formed of a plurality of planer walls that are joined together in a known manner and mounted to the frame 40 in a known manner so as to form the space 38 above a plurality of floor levels. In particular, the main housing 40 includes a front vertical wall 42, a rear vertical wall 44, a left side or drivers side vertical wall 46, a right side or passenger side vertical wall 50, and an overhead vertical wall 52 that all join together in a mutually orthogonal manner to form a substantially rectangular shaped enclosure having the living space 38 formed therein. Furthermore, the main housing 40 is further comprised of a rear lower horizontal wall 55, a middle lower horizontal wall 57, and an front lower horizontal wall 68 that are mounted directly above the rear platform 58, middle platform 63, and front platform 65, respectively, of the frame 34.

Moreover, the upper surfaces of the rear, middle, and front horizontal walls 55, 57, and 68 respectively form a rear floor 56, a middle floor 62, and a front floor 66. In particular, the middle floor 62 is elevated above the rear floor 56 and separated from the rear floor 56 by a rear step 53 that rises from the rear floor to the middle floor. Furthermore, the front floor 66 is elevated above the middle floor 62 and separated from the middle floor 62 by a front step 69 that rises from the middle floor 62 to the front floor 66. Consequently, the living space 38 formed within the main housing 40 is segmented into a rear space 54 that encompasses the rear floor 56, a middle space 60 that encompasses the middle floor 62, and a front space 64 that encompasses the front floor 66.

As generally shown in FIG. 1, the trailer 30 further comprises a known wheel assembly 36 having a plurality of rotatable wheels that attaches to the frame so as to enable the trailer 30 to be transported on a road. Furthermore, the trailer 30 further comprises a known male hitch assembly 37 at the front of the trailer 30 that couples with a known female hitch assembly of a towing vehicle so that the trailer 30 can be towed by the towing vehicle.

As generally shown in FIG. 1, the two level extendable housing 32 that is adapted to extend from the main housing 40 of the trailer 30 is formed of a plurality of walls that join together to form a supplemental living space 35 therein. In particular, the housing 32 comprises an outboard vertical wall 84, an overhead horizontal wall 86, a front lateral vertical wall 88, a rear lateral vertical wall 90, a rear lower horizontal wall 92 having a lower floor 98 formed thereon, a front lower horizontal wall 94 having an upper floor 102 formed thereon, and a middle lateral vertical wall 96 that collectively join together in a substantially orthogonal manner. Specifically, the middle vertical wall 96 vertically offsets the rear lower horizontal wall 92 from the front lower horizontal wall 94 so that the upper floor 102 is elevated above the lower floor 98. Furthermore, the extendable housing 32 includes an inboard opening 85 that allows access to the supplemental living space 35, wherein the opening 85 is positioned opposite of the outboard vertical wall 84. Moreover, the supplemental living space 35 comprises a lower space 41 that encompasses the lower floor 98 and an upper space 43 that encompasses the upper floor 102 of the extendable housing 32. As will be described in greater detail below, the lower space 41, in the preferred embodiment, forms a part of a bathroom area 73 and the upper space 43 forms a part of a sleeping area 77 of the trailer 30.

As generally shown in FIG. 1, the main housing 40 of the trailer 30 includes the opening 39 that enables the two level extendable housing 32 to extend from the main housing 40. In particular, the opening 39 is formed with a perimeter 45 having a shape that enables the two level extendable housing 32 to extend from the opening 39 when the extendable housing 32 is placed into the deployed configuration. Moreover, the opening 39 is formed with a shape that provides a substantially airtight seal when the extendable housing 32 is placed in the retracted configuration. Furthermore, the opening 39 is positioned adjacent to the middle and front spaces 60 and 64 of the trailer 30 so as to allow the extendable housing to extend into and out of the middle and front spaces 60 and 64 of the trailer 30.

As generally shown in FIG. 1, the two level extendable housing 32, in the deployed configuration, extends through the opening 39 of the main housing 40 along a direction that is substantially perpendicular to the left side vertical wall 46 so that the opening 85 of the extendable housing 32 substantially aligns with the opening 39 of the main housing 40 so as to provide the trailer 30 with an expanded interior middle space 70 and an expanded interior front space 71. In particular, the extendable housing 32 is positioned so that the middle floor 62 of the main housing 40 extends into the lower floor 98 of the extendable housing 32 so as to combine the middle space 60 of the main housing 40 with the lower space 41 of the extendable housing 32 into the expanded middle space 70. Furthermore, the extendable housing 32 is positioned so that the front floor 66 of the main housing 40 extends into the upper floor 102 of the extendable housing 32 so as to combine the front space 64 of the main housing 40 with the upper space 43 of the extendable housing 32 into the expanded front space 71.

As schematically shown in FIG. 1, the two level extendable housing 32 is coupled to an actuator assembly 33 that moves the two level housing 32 between the deployed configuration and the retracted configuration. In the preferred embodiment, the actuator assembly 33 is comprised of a rear horizontal slidable rail 106a having a rear upwardly extending vertical bracket 104a at an outboard end of the rail 106a and a front slidable rail 106b having a front upwardly extending vertical bracket 104b at an outboard end of the rail 106b, wherein the rear and front brackets 104a and 104b attach to the extendable housing 32 so that movement of the rails 106a and 106b produce a corresponding movement of the extendable housing 32 between the extended and retracted positions.

As schematically shown in FIG. 1, the rails 106a and 106b laterally extend from the frame 40 along different horizontal planes. In particular, the rail 106a extends from the middle platform 63 of the frame 34 and is positioned beneath the rear horizontal wall 92 of the extendable housing 32 so that the rear bracket 104a can attach to the extendable housing 32 in a manner which will be described in greater detail below. Similarly, the rail 106b extends from the front platform 65 of the frame 34 and is positioned beneath the front horizontal wall 94 of the extendable housing 32 so that the front bracket 104b can attach to the extendable housing 32. As will be described in greater detail below in connection with FIGS. 3A–3B, the actuator assembly 33 is further comprised of a two level drive assembly 47 that moves the vertically offset rails 106a and 106b in a lateral manner so as to move the extendable housing 32 between the deployed configuration and the retracted configuration.

Figure 2A:
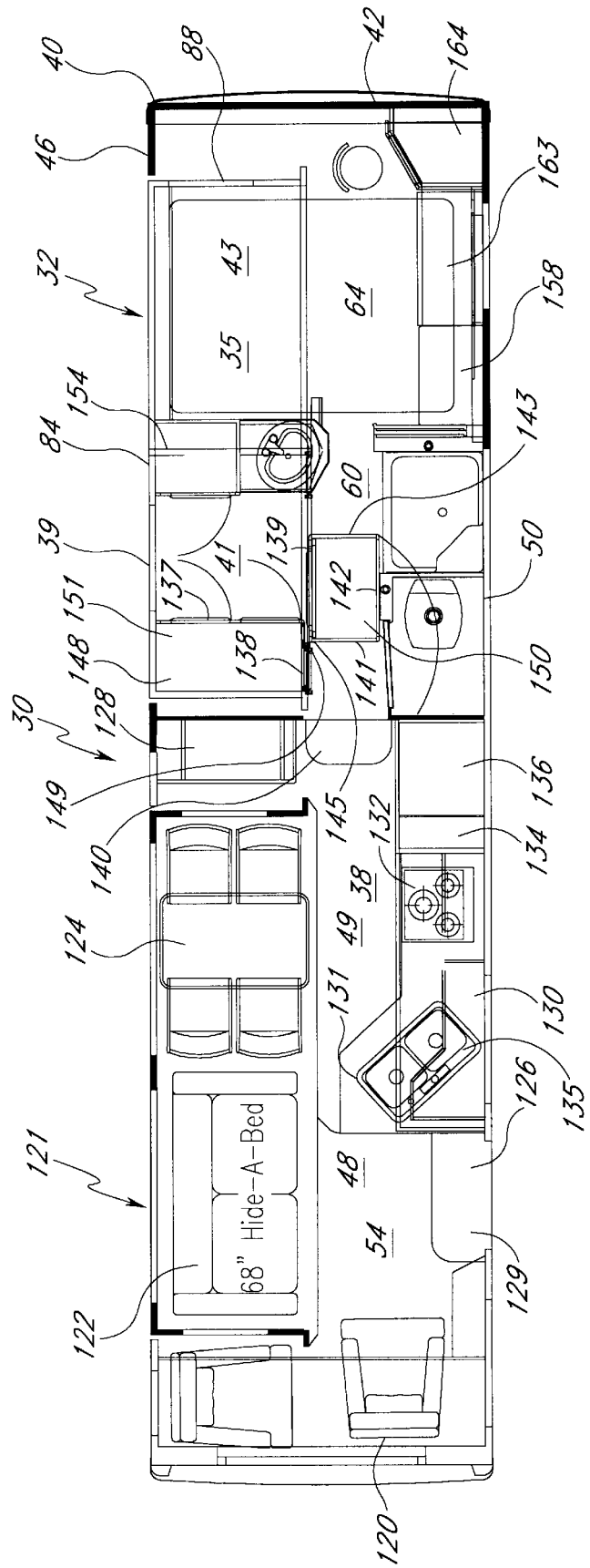
FIG. 2A is an overhead plan view of the travel trailer of FIG. 1 showing the two level extendable member in a retracted configuration.
Figure 2B:
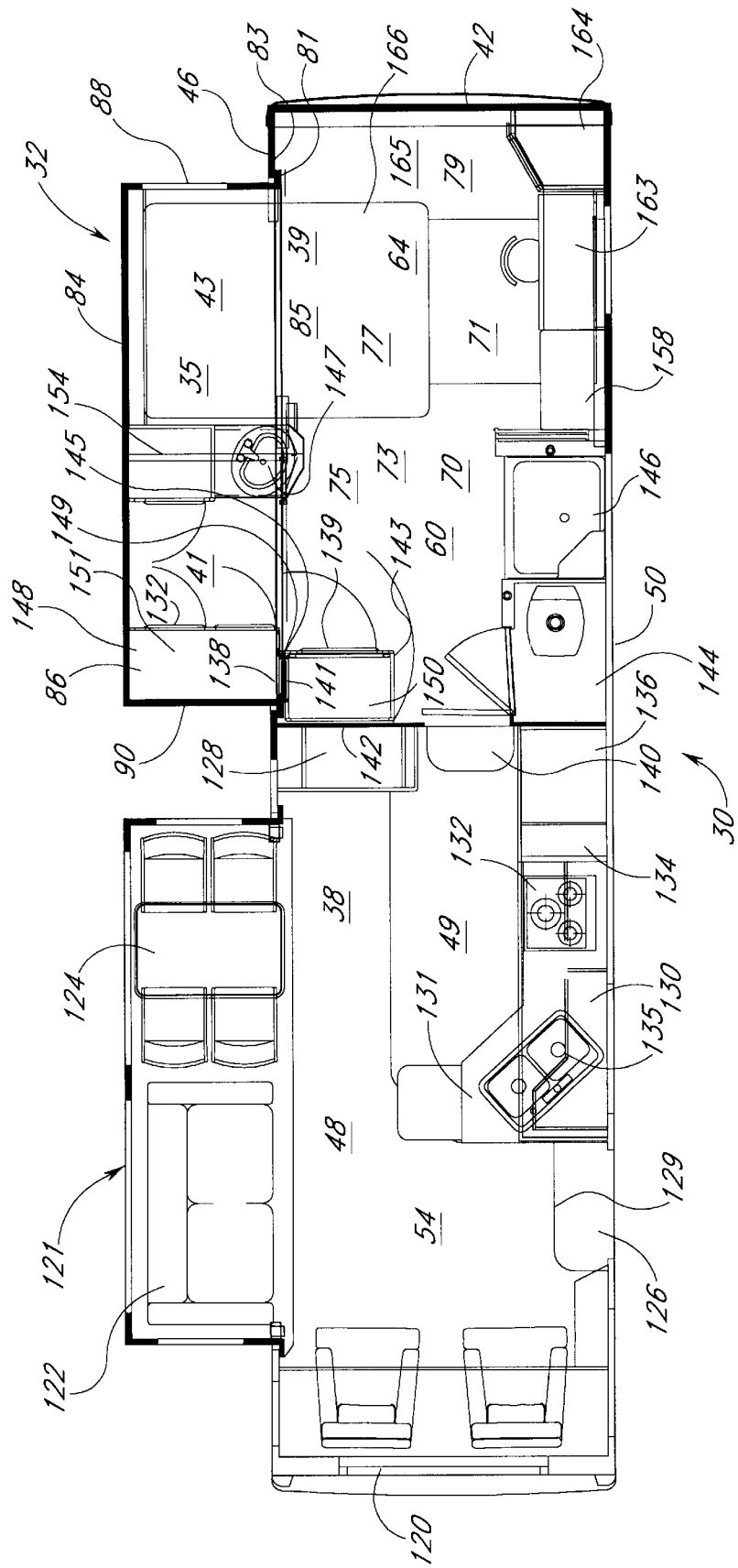
FIG. 2B is an overhead plan view of the travel trailer of FIG. 1 showing the two level extendable member in a deployed configuration.

Reference will now be made to FIGS. 2A and 2B which provide a detailed plan view of the living space 38 within the trailer 30 of FIG. 1. In particular, FIG. 2A illustrates the trailer 30 with the extendable housing 32 in the retracted configuration and FIG. 2B illustrates the trailer 30 with the extendable housing 32 in the deployed configuration. Moreover, in FIGS. 2A and 2B, the front of the trailer 30 is shown on the right hand side of the page and the rear of the trailer 30 is shown in the left hand side of the page.

As shown in FIG. 2A, the extendable housing 32, in the retracted configuration, extends into the main housing 40 so that the extendable housing 32 is substantially positioned within the middle and front spaces 60 and 64 of the living space 38 of the trailer 30. Consequently, the outboard vertical wall 84 of the extendable housing 32 is aligned with the opening 39 of the main housing 40 so as to form the trailer 30 with a more aerodynamic shape and so as to reduce the effective width of the trailer 30 while the trailer is being towed.

As shown in FIG. 2B, the extendable housing 32, in the deployed configuration, extends out of the opening 39 of the left vertical side wall 46 of the main housing 40 so that the opening 85 of the extendable housing 32 aligns with the opening 39 of the main housing 40. Thus, the lower and upper spaces 41 and 43 of the supplemental living space 35 of the extendable housing 32 combine with the middle and front spaces 60 and 64 of the living space 38 of the housing 40 to form the expanded middle and front spaces 70 and 71 of the trailer 30.

As shown in FIGS. 2A and 2B, the extendable housing 32 further comprises a lip 81 that outwardly extends from the inboard edges of the front, overhead, and rear walls 88, 86, and 90 of the extendable housing 32 in a substantially orthogonal manner. In particular, when the extendable housing 32 is placed in the deployed configuration of FIG. 2B, the lip 81 flushly contacts an inner surface 83 of the main housing 40 adjacent the opening 39 of the left side vertical wall 46 of the main housing 40 so as to partially support the extendable housing 32 in the deployed configuration. As will be described below in connection to FIG. 4B, the actuator assembly 33 provides additional support to the extendable housing 32 in the extended position.

As shown in FIGS. 2A and 2B, the preferred embodiment of the trailer 30 further comprises a conventional single level extendable housing 121 having a deployed configuration and a storage configuration. In particular, the single level extendable housing 121, when in the deployed configuration as shown in FIG. 1B, extends through the main housing 40 so as to increase the rear space of the trailer 30. Furthermore, the single level extendable housing 121, when in the retracted configuration as shown in FIG. 1A, is substantially positioned within the main housing 40 so as to provide the trailer 30 with a shape and size that is more suitable for traveling.

As shown in FIGS. 2A and 2B, the rear space 54 of the trailer 30 includes a living room area 48 and a kitchen area 49. In particular, the living room area 48 includes a plurality of recliner chairs 120, a hide-a-bed 122, a set of dining furniture 124, an entertainment center 128 for storing a television, and an entry area 129 adjacent an entry door 126 which is positioned within the right side vertical wall 50 of the main housing 40. Moreover, the hide-a-bed 122 and the set of dining furniture 124 are positioned within the single level extendable housing 121 so that the hide-a-bed 122 and the set of dining furniture 124 are displaced away from the kitchen area 49 when the single level extendable housing 121 is placed into the deployed configuration. Furthermore, the kitchen area 49 includes a cabinet assembly 130 that comprises a kitchen counter 131, a stove 132, a food pantry 134, a refrigerator 136, a kitchen sink 135, and a step 140 that provides easy access to the elevated expanded middle space 70 of the trailer 30.

As shown in FIG. 2B, the expanded middle space 70 comprises a bathroom area 73 and a dressing room area 75. In particular, the bathroom area 73 includes a toilet closet 144, a shower 146, and a bathroom sink 147. Furthermore, the dressing room area 75 includes a movable cabinet such as a foldable wardrobe assembly 151 having a deployed configuration and a retracted configuration that will be described in greater detail below and a storage cabinet 154. Moreover, the foldable wardrobe assembly 151, the storage cabinet 154, and the bathroom sink 147 are attached to the two level extendable housing 32 within the lower space 41 of the housing 32 so that the assembly 151, cabinet 154 and sink 147 are displaced away from the toilet closet 144 and shower 146 when the housing 32 is placed into the deployed configuration (FIG. 2B). To accommodate movement of the sink 147 with respect to the frame 34, the sink 147 includes a known flexible hose assembly that communicates a faucet of the sink 147 with a fresh water reservoir and communicates adrain of the sink 147 with a waste water reservoir in a manner known in the art.

As shown in FIGS. 2A and 2B, the foldable wardrobe assembly 151 comprises a stationary cabinet 148 that is fixedly mounted to the two level extendable housing 32 within the lower space 41 of the housing 32, and a movable cabinet 150 which is pivotally mounted to the stationary cabinet by way of a hinge 149 so that the rotational axis of the hinge 149 is aligned in a vertical direction. As shown in FIG. 2B, the stationary cabinet 148 includes a front side 137 and an inboard side 138 and the movable cabinet 150. includes a front side 139, an outboard side 141, an inboard side 143, and a rear side 142, wherein the front and rear sides 139 and 142 are wider than the inboard and outboard sides 141 and 143. Furthermore, the hinge 149 couples with the inboard side 138 of the stationary cabinet 148 and further couples with the movable cabinet 150 along a corner 145 that connects the front side 139 with the outboard side 141 of the movable cabinet 150.

As shown in FIG. 2A, the foldable wardrobe assembly 151 is placed into the retracted configuration by rotating the movable cabinet 150 about the hinge 149 so that the wider front side 139 of the movable cabinet 150 is substantially aligned with the inboard side 138 of the stationary cabinet 148. As a result, the extendable housing 32 is able to be placed in the retracted configuration so that the rear side 142 of the movable cabinet 150 is flushly positioned adjacent the toilet closet 144.

As shown in FIG. 2B, when the extendable housing 32 is placed in the deployed configuration, a space is created with enables the foldable wardrobe assembly 151 to be placed into the deployed configuration. In particular, the movable cabinet 150 is rotated about the hinge 149 so that the outboard side 141 of the movable cabinet 150 substantially aligns with the inboard side 138 of the stationary cabinet 148. Thus the foldable wardrobe assembly 151 forms an elongated shape which is similar to that of known wardrobes. Moreover, the fully deployed extendable housing 32 provides sufficient room between the movable cabinet 150 and the toilet closet 144 so that a person can walk therebetween and so that a person can access the toilet closet 144.

As shown in FIG. 2B, the expanded front space 71 comprises a sleeping area 77 and a study area 79. In particular, the sleeping area 77 includes a queen sized bed 166 and an access space 165 adjacent the front vertical wall 42 of the main housing 40 that enables individuals to access the bed 166 in a convenient manner. Furthermore, the study area 79 includes a linen closet 158, a table 163, a chair 162, and a corner cabinet 164.

As shown in FIGS. 2A and 2B, the bed 166 is fixedly attached to the extendable housing 32 so that the bed 166 extends through the opening 39 of the main housing 40 when the extendable housing 32 is placed in the deployed configuration. Furthermore, the inboard end of the bed 166 is positioned under the linen closet 158 and table 163 when the extendable housing 32 is placed in the retracted configuration. Moreover, the bed 166 extends away from the linen closet 158, the table 163, and the corner cabinet 164 when the extendable housing 32 is placed in the deployed configuration so as to form a space therebetween that allows individuals to access the sleeping area 77 and study area 79.

It will be appreciated that the two level extendable housing 32 provides the trailer 30 with a more luxurious atmosphere. In particular, the expanded middle space 70 of the trailer 30 which results from the extendable housing 32 being placed in the deployed configuration provides ample room for individuals to conveniently utilize the bathroom and dressing areas 73 and 75. In contrast, travel trailers known in the art, including those having known extendable housings, typically comprise relatively small bathroom and dressing areas.

It will also be appreciated that the enlarged middle space 70 of the trailer 30 combined with the retractable nature of the foldable wardrobe assembly 151 enables the assembly 151 to be positioned outside from the sleeping area 77. Consequently, the sleeping area 77 is able to include the access space 165 so that individuals can conveniently access the bed 166. In contrast, travel trailers known in the art that utilize extendable housings typically position a wardrobe adjacent a front wall of the trailer adjacent to a sleeping area so that the space within the sleeping area is substantially reduced.

Figure 2C:
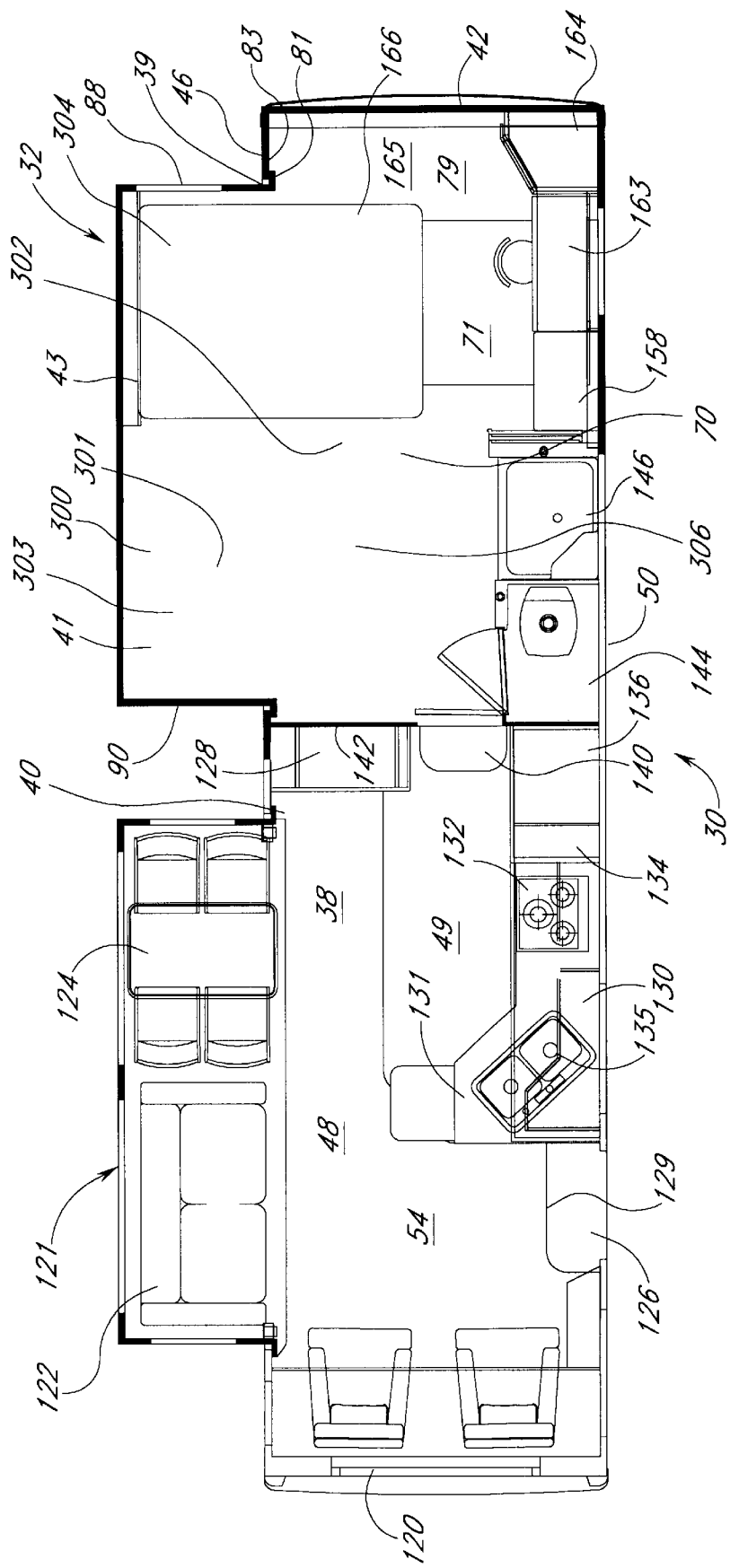
FIG. 2C is an overhead plan view of another embodiment of the travel trailer of FIG. 1 showing the two level extendable member in a deployed configuration including a walk-in closet in the main housing.

Reference will now be made to FIG. 2C which provides another embodiment of the floor plan of the living space 38 within the trailer of FIG. 1 while the extendable housing 32 is the deployed configuration. FIG. 2C shows the expanded middle space 70 of the trailer 30 comprising a walk-in closet 300. In particular, the sleeping area 302 includes a queen sized bed 304 and an access space 306 that enables individuals to access the bed 304 and walk-in closet 300 in a convenient manner. As shown in FIG. 2C, the bed 304 is fixedly attached to the upper space 43 of the two level extendable housing 32 so that the bed 304 extends through the opening 39 of the main housing 40 when the extendable housing 32 is placed in the deployed configuration. Furthermore, the walk-in closet 300 is fixedly attached to the lower space 41 of the extendable housing 32 so that the walk-in closet 300 extends through the opening of the main housing 40 when the extendable housing 32 is placed in the deployed configuration so as to provide individual access to the closet 300 in a convenient manner.

Unlike most conventional travel trailers that have rather cramped sleeping areas, this particular embodiment provides travelers the luxury of having access to a spacious walk-in closet that is conveniently located adjacent the bedroom and bathroom. In one embodiment, the walk-in closet 300 has a floor space 301 that is at least 21 square feet, having a length of approximately 6 feet and a widthi of approximately 3.5 feet However, it can be appreciated that the walk-in closet 300 can comprise olier sizes and dimensions without departing from the spirit of the invention. In another embodiment, the floor space 301 of the walk-in closet 300 is preferably at least 4% of the available living space within the travel trailer, more preferably at least 5%. Advantageously, this particular embodiment provides travelers the convenience of having access to a spacious walk-in closet while enjoying substantially the same sleeping area as most conventional recreational vehicles.

Figure 2D:
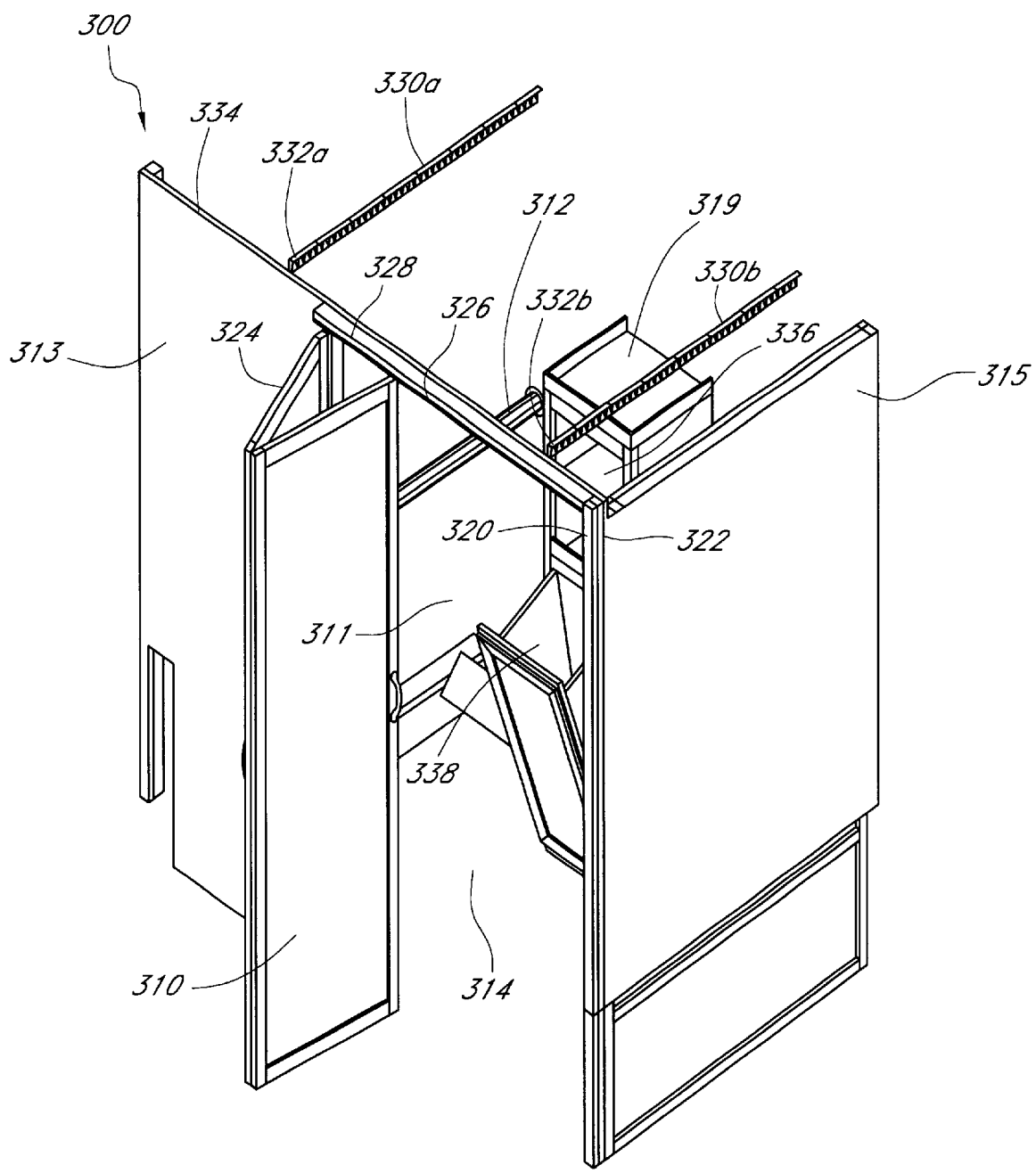
FIG. 2D is a front isometric view of the walk-in closet of FIG. 2C.

FIG. 2D illustrates a front isometric view of the walk-in closet 300 of the preferred embodiment. As FIG. 2D shows, the walk-in closet 300 is generally rectangular in shape and defined by a front wall 313 and a side wall 315. Preferably a lateral edge 320 of the front wall 313 is joined orthogonally to a lateral edge 322 of the side wall 315. As will be described in greater detail below, the front and side walls 313, 315 of the closet 300 are respectively positioned adjacent the front lateral wall and outboard vertical wall of the extendable housing so as to enclose a rectangular floor space. In one embodiment, the rectangular floor space is approximately 6 feet by 3.5 feet. However, it can be appreciated that the closet floor space can take on various dimensions without departing from the spirit of the invention. In one embodiment, a drop ceiling is placed in the walk-in closet to enhance the interior appearance of the closet.

As FIG. 2D further shows, the front wall 313 of the closet 300 has an opening 311 that is dimensioned for individuals to conveniently enter. In this embodiment, the opening 313 comprises a door that provides access between the bathroom and the walkin closet. The door can be shut thereby hiding the clothes from other people who are using the bathroom. Since the door to the walk-in closet opens into the bathroom, people can immediately access their clothes after taking a shower or bathing. In one embodiment, the opening 311 is approximately 3 feet wide and 6 feet high. Furthermore, the opening 311 is covered by a door 310. Preferably, when the door 310 is in an open position, it can be folded vertically in a well known manner. As FIG. 2D further shows, inside the closet 300, there is an access space 314 for individuals to move freely. Preferably, the access space 314 is large enough for an individual to comfortably change clothes, move around, and reach for stored items. In one embodiment, a storage cabinet 319 is placed inside the closet 300 to provide additional storage space for travelers. Preferably, the cabinet 319 comprises shelving space 336 as well as a hamper 338 that is adapted to store clothing and the like. Preferably, the hamper 338 is configured to pivot outwardly when it is in an open position. As FIG. 2D further shows, the closet 300 is sufficiently large so that the cabinet 319 will not consume a significant portion of the closet space so as to affect an individual's ability to move around inside the closet.

Figure 2E:
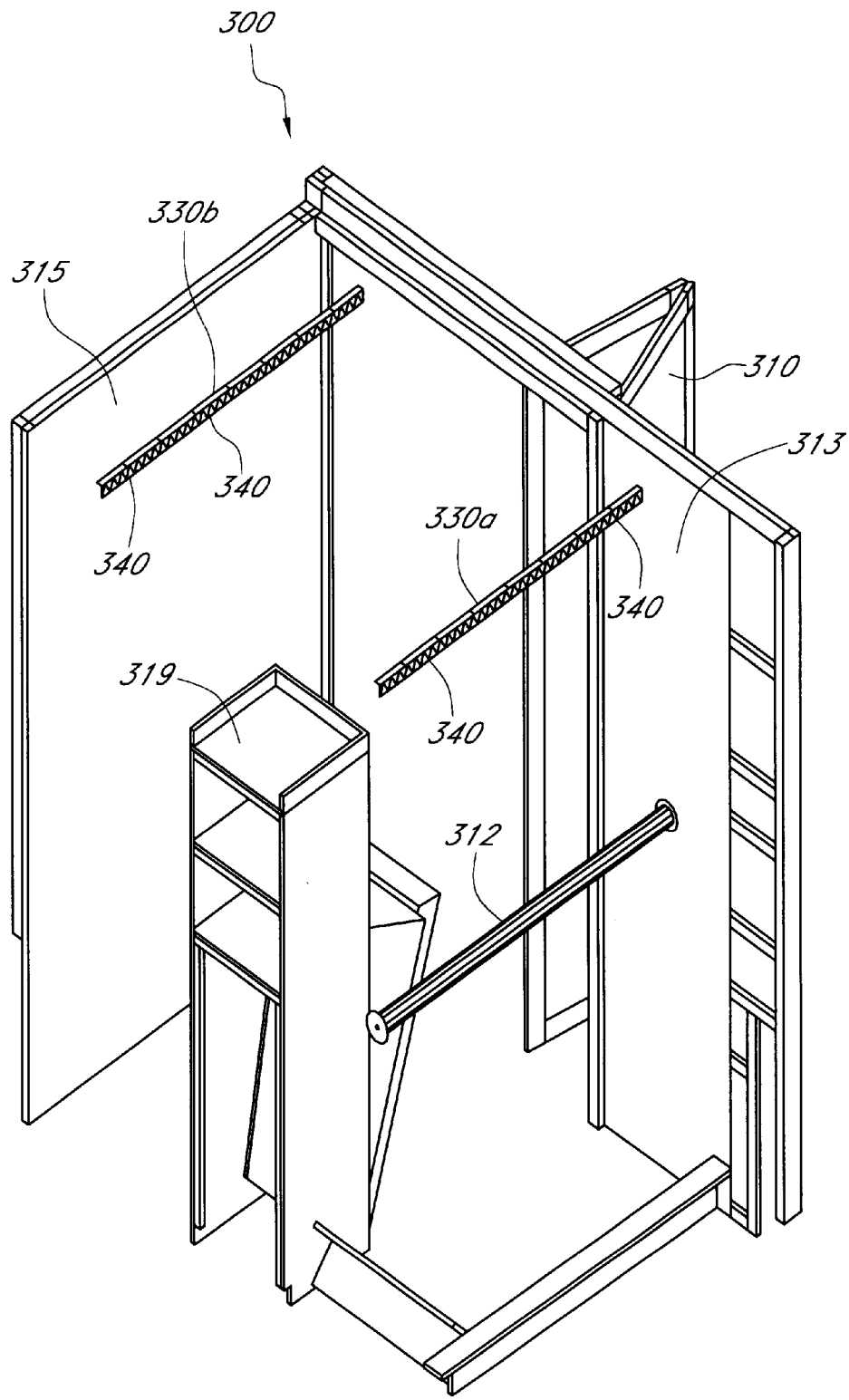
FIG. 2E is a rear isometric view of the walk-in closet of FIG. 2C.

FIG. 2E provides a rear isometric view of the walk-in closet 300 of the preferred embodiment. As FIG. 2E illustrates, a plurality of hanging devices 330a, 330b are adapted to be fixedly attached to the ceiling of the walk-in closet. Preferably, the hanging devices 330a, 330b are parallel to each other and each hanging device 330a, 330b has a plurality of slots 340 that are adapted to receive the hooks of hangers. In one embodiment, the hanging devices 330a, 330b comprise a plurality of rods that define a plane substantially parallel to the floor of the travel trailer or the floor of the extendable housing of the trailer. As such, the rods 330a, 330b permit individuals to hang their clothing in parallel rows inside the closet 300. Furthermore, it can be appreciated that more than two parallel rods may be attached to the ceiling of the closet without departing from the scope of the invention. In another embodiment, the parallel rods may also be attached to the walls of the closet in a manner so as to define a plane that is substantially parallel to the floor of the extendable housing of the trailer. As FIG. 2E shows, the walk-in closet 300 of the preferred embodiment also provides a third rod 312 which is positioned below the first rod 330a and can also be used for clothes hanging.

Figure 2F:
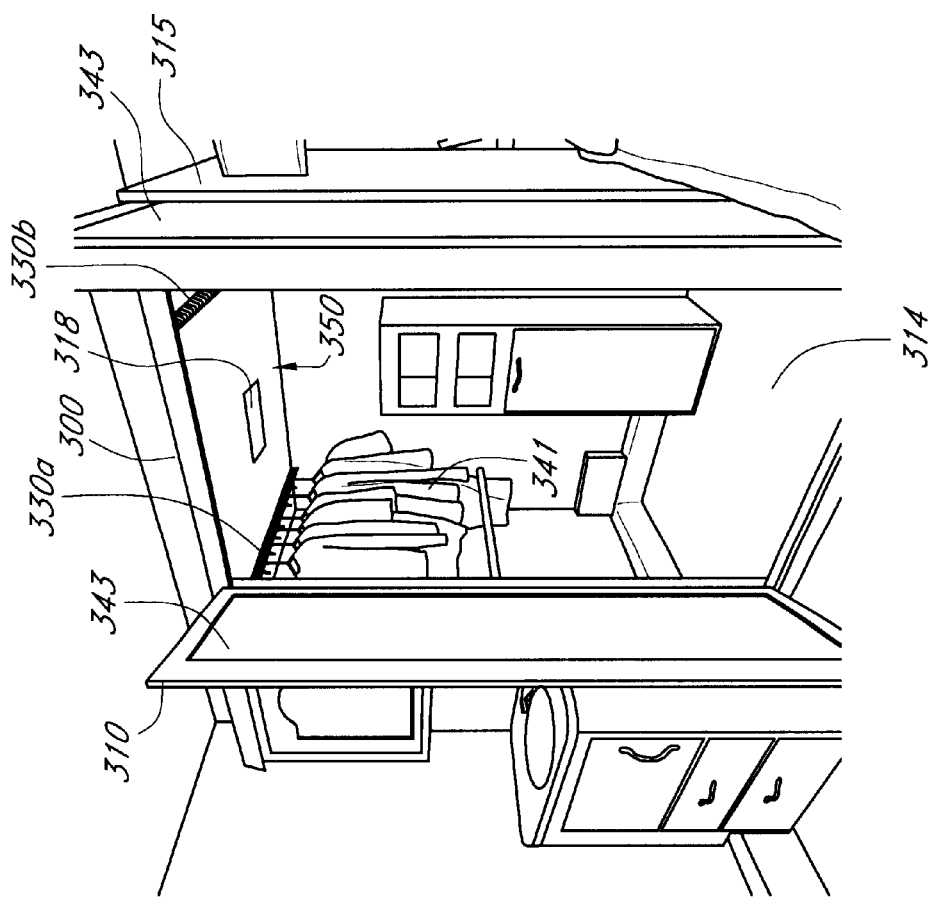
FIG. 2F is an exploded view of the walk-in closet of FIG. 2C mounted in the bedroom area of the travel trailer.

FIG. 2F illustrates an exploded view of the walk-in closet 300 mounted in the bedroom section of the trailer. As FIG. 2F shows, the closet 300 provides sufficient access space 314 for individuals to change their clothing inside the closet 300 or otherwise move around. In one embodiment, a lighting device 318 is positioned inside the walk-in closet 300 so as to permit individuals to see more clearly inside the closet 300. Furthermore, a mirror 340 can be placed on the closet door 310 or the side wall 315 of the closet 300. Furthermore, as it is shown in FIG. 2F, clothing 341 can be hung on the first rod 330a that is attached to the closet ceiling.

The walk-in closet 300 of the preferred embodiment affords individuals the convenience and luxury of having a spacious closet that can also serve as a change room. Furthermore, the closet 300 allows the individuals to bring with them more clothes and personal items while traveling. As described above in detail, the walk-in closet 300 does not consume any space that is reserved for the sleeping area 302 or the bedroom because the walk-in closet 300 is positioned on the lower space 41 of the extendable housing 32 in a manner such that it is extended outwardly along with the bed 302 when the extending housing 32 is fully deployed. It will be appreciated that the walk in closet can be positioned in the main portion of the housing with other components of the bathroom being positioned in the extendable housing without departing from the spirit of the present invention. Advantageously, the recreational vehicle of the preferred embodiment allows travelers to enjoy the convenience of having access to a spacious walk-in closet and still provides substantially the same living space as most conventional recreational vehicles.

Figure 3D:
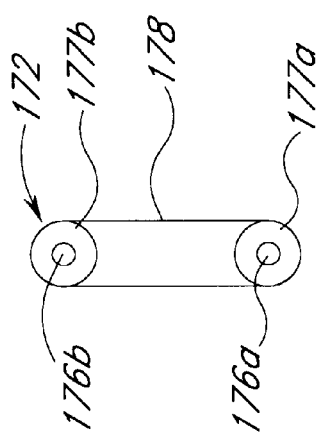
FIG. 3D is a side view of a torque transfer assembly of the two level actuator assembly of FIG. 3A that induces a lower horizontal shaft and an upper horizontal shaft of the two level actuator assembly to rotate in a synchronous manner
Figure 3C:
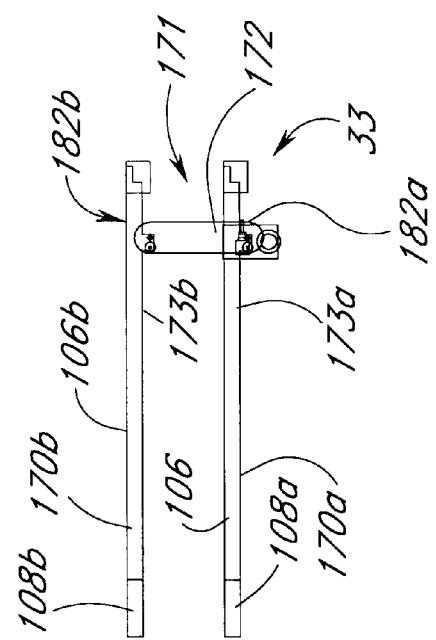
FIG. 3C is a front elevational view of the actuator assembly of FIG. 3A.

Reference will now be made to FIG. 3A–FIG. 3D which provide detailed illustrations of the actuator assembly 33 used to move the extendable housing 32. In particular, FIG. 3A is an overhead plan view of the actuator assembly 33, wherein the left side of FIG. 3A corresponds to the rear end of the actuator assembly 33 and the right side of FIG. 3A corresponds to the front end of the actuator assembly 33. Furthermore, FIG. 3B is a side elevational view of the actuator assembly 33, wherein the left side of FIG. 3B corresponds to the rear end of the actuator assembly 33 and the right side of FIG. 3B defines the front end of the actuator assembly 33. Moreover, FIG. 3C is a front elevational view of the actuator assembly 33. Additionally, FIG. 3D is a side elevational view of a torque transfer assembly 172 of the actuator assembly 33 from the perspective of an observer who is looking along the elongated axis of a rear horizontal shaft 176a.

As shown in FIGS. 3A–3C, the actuator assembly 33 is comprised of a rear rail assembly 170a, a front rail assembly 170b, and a drive assembly 171 interposed therebetween, wherein the front rail assembly 170b is elevated above the rear rail assembly 170a. As best shown in FIGS. 3A and 3C, the rear rail assembly 170 is comprised of a rear fixed support guide 108a and the rear horizontal slidable rail 106a that extends from the support guide 108a in a telescoping manner. Specifically, the rail 106a is adapted to slidably extend from an elongated channel formed within the support guide 108a so that the motion of the rail 106a is restricted to be along the elongated channel of the support guide 108a. Furthermore, a substantial portion of the slidable rail 106a will always remain within the support guide 108a so as to enable the rail 106a to function as a cantilever as will be described in greater detail below.

As shown in FIG. 3A–3C, the front rail assembly 170b is substantially similar to the rear rail assembly 170a and is positioned so as to be elevated above the rear rail assembly 170a. As best shown in FIGS. 3A and 3C, the front rail assembly 170b is comprised of a front fixed support guide 108b and the front horizontal slidable rail 106b that extends from the support guide 108b in a telescoping manner. Specifically, the rail 106b is adapted to slidably extend from an elongated channel formed within the support guide 108b so that the motion of the rail 106b is restricted to be along the elongated channel of the support guide 108b. Furthermore, a substantial portion of the slidable rail 106b will always remain within the support guide 108b so as to enable the rail 106b to function as a cantilever as will be described in greater detail below.

As shown in FIG. 3A and 3C, the front and rear rail assemblies 170a and 170b are preferably positioned so that the support guides 108a and 108b are aligned in a parallel manner and so that the outboard ends of the support guides 108a and 108b are both positioned in a common plane which is perpendicular to the elongated axis of both the support guides 108a and 108b. Furthermore, the rear slidable rail 106a is adapted with a plurality of uniformly spaced rack groves 173a along a lower surface of the rail 106a that enable the slidable rail 106a to form a portion of a rear rack and pinion assembly 182a. Similarly, the front slidable rail 106b is adapted with a plurality of uniformly spaced rack groves 173b along a lower surface of the rail 106b that are substantially similar to the groves 173a of the rear rail 106a that enable the slidable rail 106b to form a portion of a front rack and pinion assembly 182b that is substantially similar to the rear rack and pinion assembly 182a.

As schematically shown in FIG. 3A and 3B, the drive assembly 171 of the actuator assembly 33 is comprised of a rear pinion 175a, a rear horizontal shaft 176a, the torque transfer assembly 172, a front horizontal shaft 176b, a front pinion 175b which is substantially similar to the rear pinion 175a, and an electric motor 183. In particular, the rear pinion 175a is fixedly attached at a rear end of the rear horizontal shaft 176a and the front pinion 175b is fixedly attached at a front end of the front horizontal shaft 176b. Furthermore, the rear and front horizontal shafts 176a and 176b are rotatably mounted so that the rotational axes of the front and rear shaft 176a are parallel to each other and both lie in a substantially common vertical plane. Moreover, the rear horizontal shaft 176a is positioned so that the rear pinion 175a engages with the plurality of rack grooves 173a of the rear slidable rail 106a so as to form the rear rack and pinion assembly 182a. Additionally, the front horizontal shaft 176b is positioned so that the front pinion 175b engages with the plurality of rack grooves 173b of the front slidable rail 106b so as to form the front rack and pinion assembly 182b.

As schematically shown in FIGS. 3A and 3B, torque transfer assembly 172 couples the rear shaft 176a with the front shaft 176b so that a torque applied by the rear shaft 176a will be transferred to the front shaft 176b. In particular, the front end of the rear shaft 176a attaches to a descending portion of the torque transfer assembly 172 and a rear end of the front shaft 176b attaches to an ascending portion of the torque transfer assembly 172.

As shown in FIG. 3D, the preferred embodiment of the torque transfer assembly 172 comprises a lower gear 177a, an upper gear 177b, and a flexible chain 178 having a closed end. In particular, the front end of the rear shaft 176a is fixedly attached to the lower gear 177a in a conventional manner and the rear end of the front shaft 176b is fixedly attached to the upper gear 177b in a conventional manner. Furthermore, the lower and upper gears 177a and 177b are aligned in a common vertical plane and the appropriately sized chain 178 is positioned to surround the lower and upper gears 177a and 177b so that the chain 178 engages with both the lower and upper gears 177a and 177b. Consequently, when a torque is applied by the rear shaft 176a onto the lower gear 177a, the tension of the chain 178 will increase in an asymmetrical manner so that a torque is transferred to the upper gear 177b and front shaft 176b. Moreover, the diameters of the lower and upper gears 177a and 177b are substantially equal so that the rear shaft 176a and the front shaft 176b always have the same angular velocity.

As shown in FIGS. 3A and 3B, the electric motor 183 of the drive assembly 171 of the actuator assembly 33 couples with the rear shaft 176a of the drive assembly 171 in a well known manner so as to enable the electric motor 183 to activate the drive assembly 171. In particular, when electric current is passed through the electric motor 183, the electric motor 183 generates a torque which causes the rear and front shafts 176a and 176b to rotate at a substantially equal angular velocity. Consequently, the rear and front rack and pinion assemblies 182a and 182b will operate in a substantially identical manner so that the rear and front slidable rails 106a and 106b will both travel with the same linear velocity.

It will be appreciated that the actuator assembly 33 provides an effective means for moving the extendable housing 32. In particular, the electric motor 183 couples with the rear shaft 176a, thereby providing the rear shaft 176a with a torque that induces the rear shaft 176a and the rear pinion 175a into a state of rotation. Thus, since the rear pinion 175a is positioned so as to engage the rack grooves 173a of the rear slidable rail 106a, the rotating rear pinion 175a will induce the slidable rail 106a to move in a lateral manner.

Furthermore, the rear shaft 176a will provide the torque transfer assembly 172 with a torque so as to rotate the front shaft 176b. In particular, since the rear shaft 176a is coupled with the lower gear 177a of the torque transfer assembly 172, the rear shaft 176a applies a torque onto the lower gear 177a, thereby causing the chain 178 of the torque transfer assembly 172 to experience an asymmetrical tension. Thus, the chain 178 applies a torque onto the upper gear 177b which transfers the torque to the front shaft 176b, thereby inducing the shaft 176b and, consequently, the front pinion 175b into a state of rotation. Moreover, since the front and rear rack and pinion assemblies 182a and 182b are substantially identical to each other and since the lower and upper gears 177a and 177b are substantially identical to each other, the rotating front pinion 175b will induce the front slidable rail 106b into a state of motion that is substantially identical to the state of motion of the rear slidable rail 106a.

Consequently, since the rear and front slidable rails 106a and 106b are coupled with the extendable housing 32 in a manner that will be described in greater detail below, the synchronous movement of the rear and front slidable rails 106a and 106b will move the extendable housing 32 in an aligned manner. In particular, the synchronous movement of the rear and front slidable rails 106a and 106b will induce movement of the extendable housing so that the outboard wall 54 of the extendable housing 32 will tend to align with a plane which is parallel to the plane of the left side wall 46 of the main housing 40. Therefore, it is unlikely that the extendable housing 32 will become immobilized with respect to the frame 34 of the trailer 30 due to improper alignment between the extendable housing 32 and the main housing 40.

Figure 4A:
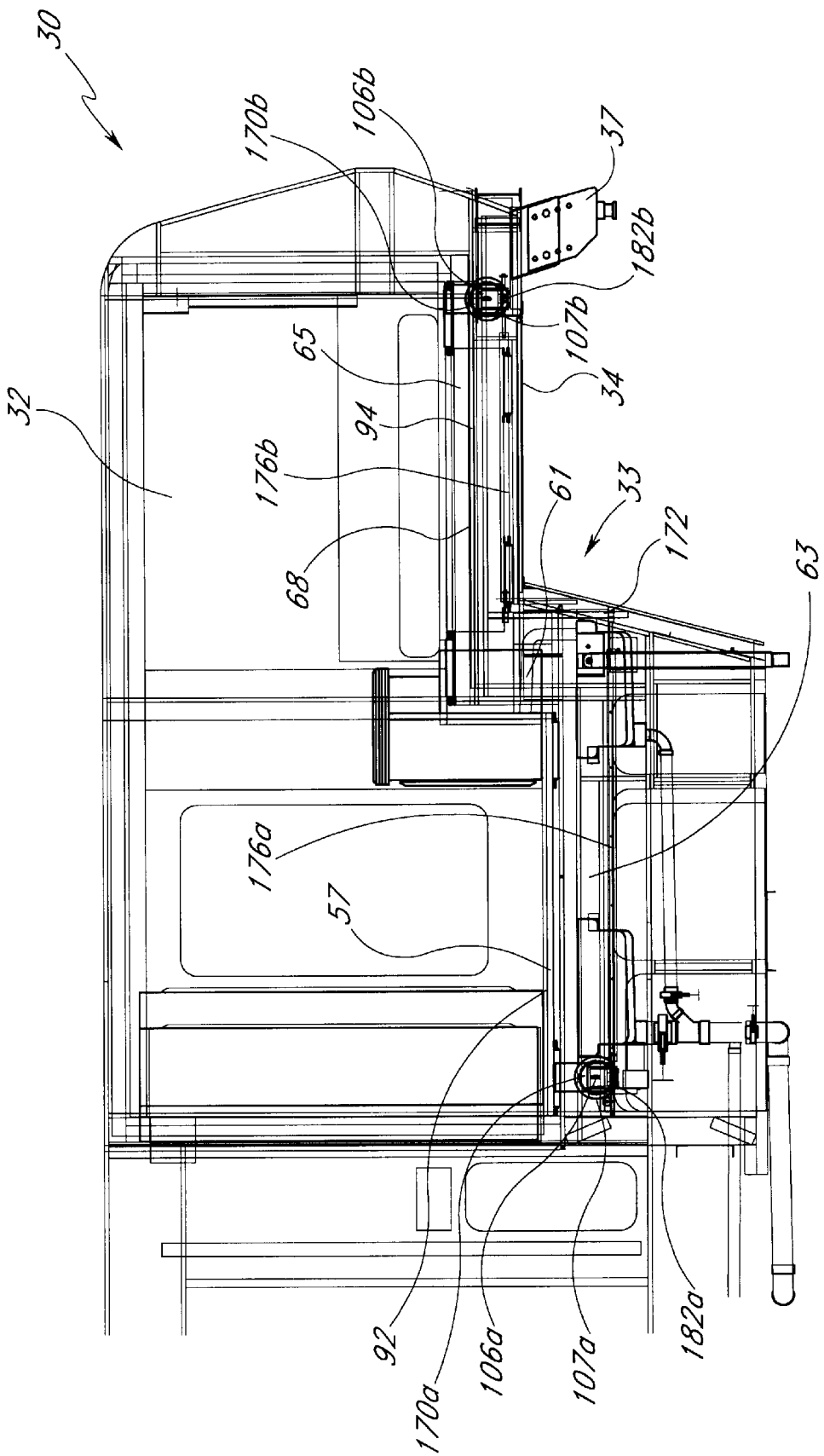
FIG. 4A is a side elevational view of the travel trailer of FIG. 1.
Figure 4B:
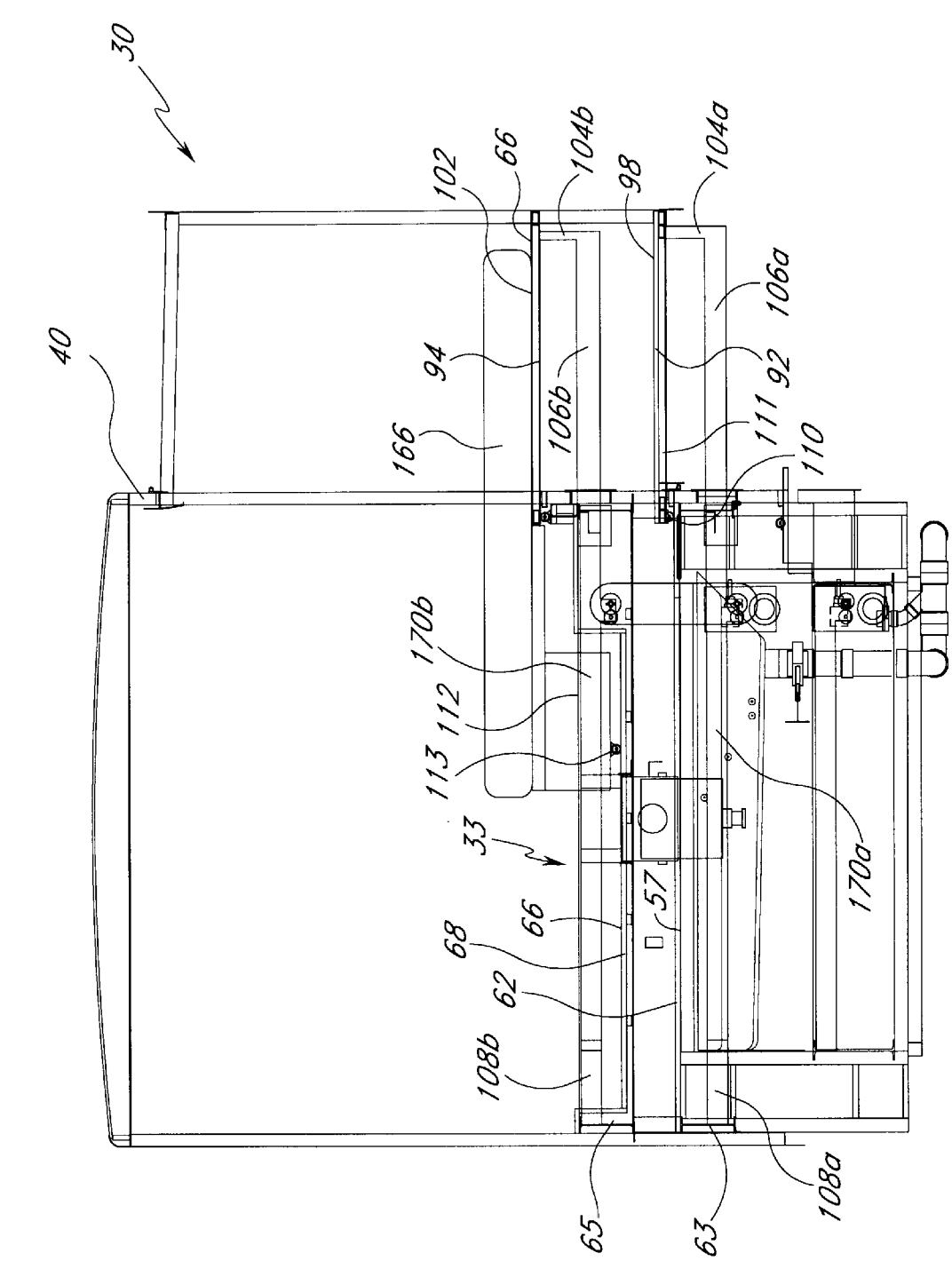
FIG. 4B is a front elevational view of the travel trailer of FIG. 1.

Reference will now be made to FIGS. 4A and 4B which illustrate the recreational travel trailer 30 in greater detail. In particular, FIG. 4A is a side elevational view of the trailer 30 of FIG. 1. Furthermore, FIG. 4B is a front elevational view of the trailer 30 of FIG. 1, wherein the extendable housing 32 is illustrated in the deployed configuration.

As shown in FIG. 4A, the actuator assembly 33 is mounted within the frame 34 of the trailer 30. In particular, the rear rail assembly 170a, the rear rack and pinion assembly 182a, and the rear horizontal shaft 176a of the actuator assembly 33 are positioned within the middle platform 63 of the frame 34 so that the rear horizontal shaft 176a is positioned in a substantially longitudinal manner and so that the rear rail assembly 170a is positioned in a lateral manner. Furthermore, the torque transfer assembly 172 of the actuator assembly 33 is positioned within the front vertical riser 61 of the frame 34. Moreover, the front horizontal shaft 176b, the front rack and pinion assembly 182b, and the front rail assembly 170b of the actuator assembly 33 are positioned within the front platform 65 of the frame 34 so that the front horizontal shaft 176b is positioned in a substantially longitudinal manner and so that the front rail assembly 170b is positioned in a lateral manner.

As shown in FIG. 4A, the rear and front horizontal slidable rails 106a and 106b of the actuator assembly 33, which are used to move the extendable housing 32 between the retracted and deployed configurations, are adapted to extend from the frame 34 of the trailer 30. In particular, the frame 34 includes a rear opening 107a at an outboard edge of the middle platform 63 adjacent the rear end of the middle platform 63 that enables the rear slidable rail 106a of the rear rail assembly 170a to extend from the frame 34 in a lateral manner. Similarly, the frame 34 includes a front opening 107b at an outboard edge of the front platform 65 adjacent the front end of the front platform 65 that enables the front slidable rail 106b of the front rail assembly 170b to extend from the frame 34 in a lateral manner.

As shown in FIGS. 4A and 4B, the actuator assembly 33 is positioned underneath the extendable housing 32 and the middle and front lower horizontal walls 57 and 68 of the trailer 30. In particular, the rear rail assembly 170a is positioned beneath the rear lower wall 92 of the extendable housing 32 and the front rail assembly 170b is positioned beneath the front lower wall 94 of the extendable housing 32. As will be described in greater detail below, the slidable rails 106a and 106b respectively couple with the rear lower wall 92 and the front lower wall 94 so as to enable the actuator assembly 33 to move the extendable housing 32 between the retracted and deployed configurations.

As shown in FIG. 4B, the lower floor 98 of the extendable housing 32 is vertically aligned with the middle floor 62 of the main housing 40 in a substantial manner and is adapted to travel across the middle floor 62 during movement of the extendable housing in a non-sliding manner. In the preferred embodiment, a known roller assembly 110 having a low profile is mounted to a lower surface 111 of the lower horizontal wall 92 of the extendable housing 32 adjacent the inboard edge of the lower horizontal wall 92 so as to be interposed between the lower surface 111 of the lower horizontal wall 92 and the middle floor 62 of the main housing 40 in a flush manner. Thus, when the extendable housing 32 is moved in a lateral manner, the roller assembly 110 will roll across the middle floor 62 so that the extendable housing 32 can be moved with a relatively small lateral force.

As shown in FIG. 4B, the preferred embodiment of the trailer 30 comprises the upper floor 102 of the extendable housing 32 that is substantially elevated above the front floor 66 of the main housing 40. In particular, this enables the outboard end of the bed 166 to be positioned directly on the upper floor 102 so that the inboard end of the bed 166 is sufficiently elevated above the front floor 66 of the main housing 40 so as to enable individuals to conveniently access the bed 166. However, it will be appreciated that, in another embodiment, the upper floor 102 of the extendable housing 32 could be adapted to align with the upper floor 66 of the main housing 40.

As shown in FIG. 4B, the inboard end of the bed 166 is supported by an inboard bed support 112 having a known roller assembly 113. In particular, the inboard bed support 112 is positioned beneath the inboard end of the bed so as to support the bed 166 as well as individuals who are sleeping on the bed 166. Furthermore, the roller assembly 113 is attached to a lower surface of the inboard bed support 112 so that the roller assembly 113 is flushly interposed between the inboard bed support 112 and the front floor 66 of the main housing 40. Thus, when the bed 166 is moved along with the extendable housing 32, the roller assembly 113 of the inboard bed support 112 will roll along the front floor 66 of the main housing 40 so as to reduce the lateral force that is required to move the extendable housing 32.

As shown in FIG. 4B, the rear and front rail assemblies 170a and 170b of the actuator assembly 33 are laterally mounted to the frame 34 of the trailer 30. In particular, the rear support guide 108a of the rear rail assembly 170a is laterally mounted within the middle platform 63 so that the slidable rail 106a can extend from the trailer 30 in a lateral manner and be supported by the rear support guide 108a. Furthermore, the front support guide 108b of the front rail assembly 170b is laterally mounted within the front platform 65 so that the slidable rail 106b can extend from the trailer 30 in a lateral manner and be supported by the front support guide 108b.

As shown in FIG. 4B, the slidable rails 106a and 106b engage with the extendable housing 32 so that they can maneuver and support the extendable housing 32. In particular, the rear and front slidable rails 106a and 106b laterally extends from the frame 34 of the trailer 30 so that the outboard ends of the rails 106a and 106b are substantially adjacent the outboard vertical wall 84 of the extendable housing 32. Furthermore, the upwardly extending bracket 104a connects the outboard end of the rear rail 106a with the rear lower horizontal wall 92 of the extendable housing 32 so that the rear rail assembly 170a can move the extending housing 32 and so that the rear slidable rail 106a of the rear rail assembly 170a can cantilever the extendable housing 32 in the deployed configuration. Moreover, the upwardly extending bracket 104b attaches the outboard end of the front rail 106b with the front lower horizontal wall 94 of the extendable housing 32 so that the front rail assembly 170b can move the extending housing 32 and so that the front slidable rail 106b of the front rail assembly 170b can cantilever the extendable housing 32 in the deployed configuration.

It will be appreciated that the two level extendable housing 32 of the trailer 30 extends across two floor levels of the trailer 30. Thus, the supplemental living space 35 formed within the extendable housing 32 is substantially greater than the supplemental living space of similarly positioned extendable housings of travel trailers known in the art. Consequently, the extendable housing 32 is able to encompass the bathroom area 73 as well as the sleeping area 77, so as to provide both of these areas with greater space.

It will also be appreciated that the actuator assembly 33 enables the extendable housing 32 to be maneuvered between the deployed and retracted configurations in a desirable manner. In particular, the vertically offset slidable rails 106a and 106b are adapted to respectively move the rear and front ends of the extendable housing 32 in a synchronous manner so as to maintain the extendable housing 32 in an aligned state with respect to the main housing 40.

It will also be appreciated that the actuator assembly can be manufactured at a relatively low cost. In particular, the components of the actuator assembly 33 can be readily fabricated and installed within the frame 34 of the trailer 32 using relatively simple installation techniques known in the art. Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A recreational vehicle comprising:
   a frame;
   a set of wheels attached to the frame to permit rolling of the recreational vehicle over the ground;
   a floor attached to the frame, wherein the floor defines an inner living space of the recreational vehicle;
   a main housing comprising of a plurality of walls mounted above the frame that enclose the inner living space of the recreational vehicle; and
   a walk-in closet enclosing a floor space wherein the floor space is at least approximately 5% of the inner living space of the recreational vehicle.

2. The recreational vehicle of claim 1 wherein the floor space of the walk-in closet is at least 21 square feet.

3. The recreational vehicle of claim 1 wherein the walk-in closet is positioned adjacent to a sleeping area.

4. The recreational vehicle of claim 1 wherein the walk-in closet comprises a drop ceiling.

5. The recreational vehicle of claim 2 wherein a plurality of hanging devices are fixedly attached to the drop ceiling wherein the hanging devices are adapted to hang articles of clothing and the hang devices are positioned substantially parallel to each other in a manner so as to permit clothing to hang in parallel rows inside the walk-in closet.

6. The recreational vehicle of claim 1 wherein the floor comprises an upper and a lower level wherein the walk-in closet is positioned on the lower level and a sleeping area is positioned on the upper level.

7. A recreational vehicle comprising:
   a frame;
   a set of wheels attached to the frame to permit rolling of the recreational vehicle over the ground;
   a floor attached to the frame, wherein the floor defines an inner living space of the recreational vehicle;
   a main housing comprising of a plurality of walls mounted above the frame that enclose the inner living space of the recreational vehicle; and a walk-in closet mounted in the main housing wherein the walk-in closet provides sufficient space for an individual to enter into the closet and move around freely wherein the walk-in closet has at least two rods adapted for hanging articles of clothing wherein the at least two rods are positioned parallel to each other and define a plane substantially parallel to the floor of the recreational vehicle.

8. The recreational vehicle of claim 7 wherein the walk-in closet comprises at least 4% of the inner living space of the recreational vehicle.

9. The recreational vehicle of claim 8 wherein the walk-in closet encloses a floor space wherein the floor space is at least 21 square feet.

10. The recreational vehicle of claim 7 wherein the walk-in closet comprises a drop ceiling.

11. A recreational vehicle comprising:

a frame;

a set of wheels attached to the frame to permit rolling of the recreational vehicle over the ground;

a floor attached to the frame, wherein the floor defines an inner living space of the recreational vehicle;

a main housing comprising of a plurality of walls mounted above the fame that enclose the inner living space of the recreational vehicle; and a walk-in closet, wherein the walk-in closet is positioned within the living space and comprises a first wall wherein the first wall has an opening adapted for individuals to enter into the walk-in closet.

12. The recreational vehicle of claim 11 further comprising an extendable housing assembly attached to a first wall of the plurality of the walls of the main housing, the extendable housing assembly including a multilevel floor having a first and a second level and a plurality of walls mounted at the outer edges of the floor, wherein the extendable housing assembly is movable between a retracted configuration and a deployed configuration, wherein the walk-in closet is positioned within the extendable housing assembly so that when the extendable housing assembly is in a deployed configuration, a portion of the walk-in closet is positioned outside the first wall of the plurality of walls of the main housing.

13. The recreational vehicle of claim 12 wherein the walk-in closet has a floor space that is at least 4% of the area of the inner living space of the recreational vehicle.

14. The recreational vehicle of claim 12 wherein the walk-in closet encloses a floor space that is at least 21 square feet.

15. The recreational vehicle of claim 12 wherein the walk-in closet comprises a plurality of rods adapted to hang articles of clothing wherein the rods are positioned substantially parallel to each other so as to permit clothing to hang in parallel rows.

* * * * *